3,708,502
TEREPHTHALDEHYDE ACETALS
Andrew P. Dunlop, Riverside, and Joseph P. Wuskell, Arlington Heights, Ill., assignors to The Quaker Oats Company, Chicago, Ill.
No Drawing. Filed July 16, 1970, Ser. No. 55,591
Int. Cl. C07d 17/00
U.S. Cl. 260—340.7          1 Claim

ABSTRACT OF THE DISCLOSURE

This invention provides terephthaldehyde acetals which are useful in the preparation of novel alkyd resins. The present invention is directed to terephthaldehyde acetals of the general formula:

$$\text{HO(CH}_2)_n\text{(CH}_2)_m\text{-O} \diagup \text{C} \diagdown \text{CH}_2\text{-O} \diagdown \text{HC-} \langle \text{C}_6\text{H}_4 \rangle \text{-CH} \diagup \text{O-CH}_2 \diagdown \text{C} \diagup \text{O-(CH}_2)_{m'}\text{(CH}_2)_{n'}\text{OH} \diagdown \text{R}'$$

wherein R is selected from the group consisting of hydrogen, methylol, and alkyl radicals; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; and wherein R' is selected from the group consisting of hydrogen, methylol, and alkyl radicals; wherein $m'$ is an integer from 0 to 1 inclusive; and wherein $n'$ is an integer from 1 to 4 inclusive when $m'$ is 0 and wherein $n'$ is an integer from 0 to 1 inclusive when $m'$ is 1.

BACKGROUND OF THE INVENTION

Field of the invention

This invention relates to terephthaldehyde acetals which are useful in the preparation of a wide variety of thermosetting alkyd resins.

More particularly this invention relates to terephthaldehyde acetals of the general formula:

$$\text{HO(CH}_2)_n\text{(CH}_2)_m\text{-O} \diagup \text{C} \diagdown \text{CH}_2\text{-O} \diagdown \text{HC-} \langle \text{C}_6\text{H}_4 \rangle \text{-CH} \diagup \text{O-CH}_2 \diagdown \text{C} \diagup \text{O-(CH}_2)_{m'}\text{(CH}_2)_{n'}\text{OH} \diagdown \text{R}'$$

wherein R is selected from the group consisting of hydrogen, methylol, and alkyl radicals; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; and wherein R' is selected from the group consisting of hydrogen, methylol, and alkyl radicals; wherein $m'$ is an integer from 0 to 1 inclusive; and wherein $n'$ is an integer from 1 to 4 inclusive when $m'$ is 0 and wherein $n'$ is an integer from 0 to 1 inclusive when $m'$ is 1.

Description of the prior art

Conventional thermosetting alkyd resins are prepared through the reaction of polybasic acid anhydrides and polyhydric alcohols. A linear polymer is obtained with a bifunctional anhydride and a bifunctional alcohol, but if either reactant has three or more reactive sites, then formation of a three-dimensional polymer is possible. The following polybasic acids have been used in the prior art: phthalic anhydride, succinic anhydride, maleic anhydride, isophthalic acid, and pyromellitic anhydride. Hereinbefore the polyhydric alcohols commonly used in alkyd resins have been alkyl polyols such as ethylene glycol, propylene glycol, glycerol, 2,2-di(hydroxy-methyl)-1-propanol, and pentaerythritol.

SUMMARY OF THE INVENTION

It is an object of this invention to provide a novel polyhydric alcohol.

It is another object of this invention to provide a novel polyhydric alcohol which when reacted with polybasic acids provides novel alkyd resins.

It is still another object of this invention to provide a novel polyhydric alcohol which when reacted with polybasic acids provides a thermosetting resin.

It is yet another object of this invention to provide a novel polyhydric alcohol which when reacted with polybasic acids and cured provides hard, infusible, and insoluble resins.

It is a further object of this invention to provide a novel polyhydric alcohol which when reacted with polybasic acids, applied between glass sheets, and cured provides useful glass laminates.

It is still a further object of this invention to provide a novel polyhydric alcohol which when reacted with polybasic acids, applied to fiber glass, and cured provides a fiber glass laminate of high impact strength.

Other objects will become apparent from the following detailed description of the invention and from the specific examples.

These objects are accomplished by novel polyhydric alcohols which are terephthaldehyde acetals of the general formula:

$$\text{HO(CH}_2)_n\text{(CH}_2)_m\text{-O} \diagup \text{C} \diagdown \text{CH}_2\text{-O} \diagdown \text{C-} \langle \text{C}_6\text{H}_4 \rangle \text{-CH} \diagup \text{O-CH}_2 \diagdown \text{C} \diagup \text{O-(CH}_2)_{m'}\text{(CH}_2)_{n'}\text{OH} \diagdown \text{R}'$$

wherein R is seelcted from the group consisting of hydrogen, methylol, and alkyl radicals; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; and wherein R' is selected from the group consisting of hydrogen, methylol, and alkyl radicals; wherein $m'$ is an integer from 0 to 1 inclusive; and wherein $n'$ is an integer from 1 to 4 inclusive when $m'$ is 0 and wherein $n'$ is an integer from 0 to 1 inclusive when $m'$ is 1.

The terephthaldehyde acetals of this invention are prepared by the method comprising contacting a polyol of the general formula:

$$\begin{array}{c} \text{CH}_2\text{OH} \\ | \\ \text{R}-\text{C}-(\text{CH}_2)_m\text{OH} \\ | \\ (\text{CH}_2)_n\text{OH} \end{array}$$

wherein R is selected from the group consisting of hydrogen, methylol, and alkyl radicals; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; with terephthaldehyde in the presence of an acid.

The reaction is conveniently and preferably carried out in an inert liquid reaction medium which is a solvent for at least one of the reactants, typically an organic liquid. Suitable such liquids include $H_2O$ and hydrocarbons such as hexane, benzene, and toluene. The reaction is also carried out neat where the polyol is of the general formula:

$$\begin{array}{c} \text{CH}_2\text{OH} \\ | \\ \text{R}-\text{C}-(\text{CH}_2)_m\text{OH} \\ | \\ (\text{CH}_2)_n\text{OH} \end{array}$$

wherein R is selected from the group consisting of hydrogen, methylol, and alkyl radicals; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; and where the polyol is a liquid at the reaction temperature. For example, glycerol is reacted with terephthaldehyde in the presence of acid and in the absence of an inert liquid reaction medium.

The reaction goes forward at temperatures over a wide range from 25° C. to 150° C. The preferred temperature range is between 80° C. and 100° C. Conveniently, where the boiling temperature of the liquid employed as reaction medium is in the reaction temperature range, the reaction is conducted at reflux.

The amounts of the reactants employed are not critical. Some of the desired product are obtained when any amount is employed. However, the reaction consumes the reactants in the molar ratio of 2 moles of glycol to 1 mole terephthaldehyde, and the use of such amounts is preferred.

In carrying out the reaction, the reactants are contacted with one another, conveniently by adding one reactant to the other in liquid reaction medium. The reaction goes forward readily with the preparation of the desired product in the reaction medium. Sometimes it is preferred to maintain the product-containing reaction mixture in the reaction temperature range following completion of the contacting of the reactants in the presence of an acid catalyst to insure completion of the reaction. The desired product is separated from the reaction mixture in conventional procedures; most typically, the reaction mitxure is filtered to separate the product. Ordinarily the separated product is relatively pure, but when desired, the product can be further purified in conventional procedures, most typically recrystallization.

The reaction of terephthaldehyde and polyol is catalyzed by acid. It is preferred to us one of the strong mineral acids such as hydrochloric or sulfuric, but other strong inorganic or organic acids may be used such as phosphoric, p-toluenesulfonic, oxalic, dichloroacetic, and trichloroacetic. The preferred amount of acid catalyst is that quantity which would result in a pH between 1 and 5 if the solvent were water.

A particular feature of the composition of this invention is that it is a novel polyhydric alcohol. These novel polyhydric alcohols are dihydric, trihydric or tetrahydric and when reacted with polybasic acids such as phthalic anhydride, succinic anhydride, maleic anhydride, isophthalic acid, and pyromellitic anhydride provide novel alkyd resins. Such resins are useful to provide glass laminates or fiber glass laminates of high impact strength.

Terephthaldehyde acetals of this invention which are dihydric if reacted with a dibasic acid or bifunctional anhydride will provide a linear polymer. If the terephthaldehyde acetal of this invention or the polybasic acid or polyfunctional anhydride has three or more reactive sites, then formation of a three-dimensional polymer is possible.

It is obvious to one skilled in the art that the degree of crosslinking in the cured novel resin may be controlled by the addition of dihydric alcohols selected from the group consisting of dihydric terephthaldehyde acetals of this invention or glycols.

DESCRIPTION OF THE PREFERRED EMBODIMENTS

The following preferred embodiments of the invention are shown for the purpose of illustrating this invention and demonstrating the best mode for practicing the invention. It will be apparent to those skilled in the art that various changes and modifications may be made therein without departing from the spirit and scope of the invention as it is more precisely defined in the subjoined claims.

In the examples the saponification equivalent was determined by conventional procedures as described by R. T. Hall and W. E. Shaeffer in "Organic Analysis" (New York: Interscience Publishers, Inc., 1954), vol. II, pp. 19-70, particularly pp. 25-27.

Example 1

To a solution of 54.4 g. (0.40 mole) of pentaerythritol in 500 ml. of deionized water was added 2.0 g. of p-toluenesulfonic acid. The solution was heated to near boiling, 95-100° C., and stirred while 6.7 g. (0.05 mole) of terephthaldehyde was added portionwise over a period of one hour. When the addition of terephthaldehyde was completed, the mixture was stirred for an additional hour while the temperature was maintained at 95-100° C. The mixture was then filtered hot in a steam heated Buchner funnel to remove the precipitated product. The crude cake of product was slurry washed with 350 ml. of deionized water, then dried in vacuo at 95° C. Seventeen grams of product were obtained representing a yield of 92% based on the starting weight of the reactants. The purified reaction product was the expected terephthalylidene bis pentaerythritol product. The product melted at 398-400° C. with decomposition. The infrared spectrum (KBr pellet) exhibited $\nu_{OH}$ 3400 cm.$^{-1}$ and $\nu_{C-O}$ 1035 cm.$^{-1}$. The formula $C_{18}H_{26}O_8$ was consistent with the product. The theoretical elemental percentage composition by weight of $C_{18}H_{26}O_8$ is C, 58.37; H, 7.07; and O, 34.56. The percentage composition by weight of the product was C, 58.28 and H, 7.15.

The product was further characterized by conversion of terephthalylidene bis pentaerythritol into the derivative terephthalylidene bis pentaerythritol tetraacetate with acetic anhydride in pyridine solution. A mixture of 4.0 g. of purified product, terephthalylidene bis pentaerythritol, 2.0 g. of p-toluenesulfonic acid, and 20 ml. of acetic acid in 80 ml. of dry pyridine was stirred with a magnetic stirrer at room temperature for 23 hours. After the stirring was halted the clear pink solution was poured into 150 ml. of a mixture of ice and water and sirred for 1 hour. A white fine precipitate was filtered off, washed with water, and dried in vacuo at 60° C. There were obtained 5.5 g. of product which represented a yield of 94.6% based on the starting weight of the reactants. The crude product was recrystallized from a mixture of chloroform and ethanol to give a derivative product with a sponification equivalent of 138.4 and was consistent with the theoretical saponification equivalent for terephthalylidene bis pentaerythritol tetraacetate. The infrared spctrum (KBr pellet) showed $\nu_{C=O}$ 1740 cm.$^{-1}$, $\nu_{O-Ac}$ 1235 cm.$^{-1}$, and $\nu_{C-O}$ 1040 cm.$^{-1}$.

A sample of crude derivative product was recrystallized from acetone, and then from a mixture of acetone and methanol. The sample was then dried at 100° C. in vacuo. The melting point of the recrystallized derivative product was 192-194° C. The formula $C_{26}H_{34}O_{12}$ was consistent with the product. The percentage composition by weight of $C_{26}H_{34}O_{12}$ is C, 57.98; H, 6.36; and O, 35.65. The percentage composition of the product by weight was C, 57.88 and H, 6.39.

Example 2

A mixture of 25.6 g. (2.78 moles) of glycerol, 1.9 g. (0.01 mole) p-toluenesulfonic acid monohydrate, and 200 ml. of benzene was heated with stirring at reflux for a period of 2½ hours under a Dean-Stark head for the continuous removal of water. At the end of 2½ hours no further water was collected. To the refluxed mixture were added 6.7 g. (0.05 mole) of terephthaldehyde and the reaction mixture was stirred at the reflux temperature of benzene for an additional 2½ hours during which time 1.5 ml. of water was collected and removed through the Dean-Stark head. The reaction mixture was cooled to room temperature and the benzene decanted from the white solid product. The product was slurry washed with two 200 ml. portions of water and then allowed to dry under ambient conditions. The product weighed 11.5 g. and corresponded to a yield of 82% based on the starting weight of the reactants. The product melted over the range of 121-131° C.

The product was further characterized by preparation of the acetate by acetylating the product with acetic anhydride in pyridine. The melting point of the derivative product was 157–163° C.

Example 3

A mixture of 25.6 g. (2.78 mole) of glycerol and 6.7 g. (0.05 mole) of terephthaldehyde was heated with stirring on a steam bath. Two drops of 50% aqueous sulfuric acid was then added to the mixture and the heating and stirring continued for about 2.5 hours. Upon cooling the mixture, a white solid precipitated. The precipitate was filtered out and slurry washed with 200 ml. of water containing 2.0 g. of sodium carbonate, then washed with 100 ml. of deionized water. The washed product was then dried in vacuo at 55° C. overnight. The product weighed 13.1 g. and corresponded to a yield of 92% based on the weight of the starting materials. The product melted at 193–198° C.

The product was further characterized by preparation of the acetate by acetylating the product with acetic anhydried in pyridine.

Example 4

A solution of 48.8 g. (0.40 mole) of trimethylol propane, 2.0 g. of p-toluenesulfonic acid, and 200 ml. of deionized water was heated to 95° C. with stirring. To the hot solution were added 6.7 g. (0.05) of terephthaldehyde over a period of one hour. When the addition was complete, the white turbid reaction mixture was stirred at reflux for an additional hour, and then cooled to 5–10° C. The product was a white precipitate which was separated by filtration. The product was washed with 200 ml. of water containing 2.0 g. of sodium carbonate and then washed three times with 200 ml. portions of water. The crude product was then dried in vacuo at 70° C. overnight. The product weighed 17.1 g. and represented a yield of 93% by weight based on the weight of the starting materials. The crude product was recrystallized from aqueous methanol. The recrystallized product weighed 14.5 g. The white crystals of recrystallized product melted a 186–188° C.

A second recrystallization from aqueous methanol provided a purified product which melted at 188–189.5° C. The formula $C_{20}H_{30}O_6$ was consistent with the product. The percentage composition by weight of $C_{20}H_{30}O_6$ is C, 65.54; H, 8.25; and O, 26.20. The percentage composition of the purified product was C, 65.55 and H, 8.25. The infrared spectrum (KBr pellet) showed $\nu_{OH}$ 3400 cm.$^{-1}$ (broad) and $\nu_{C-O}$ 1095 cm.$^{-1}$.

The purified product was further characterized by conversion to the corresponding diacetate. A sample of 4.0 g. of the purified product was dissolved in a mixture of 30 ml. of anhydrous pyridine and 15 ml. of acetic anhydride and the mixture allowed to stand at room temperature overnight. The mixture was then poured into 200 ml. of an ice and water mixture. The resulting precipitate was separated by filtration, washed with water, and dried in vacuo at 65° C. The weight of the crude derivative product was 4.7 g. The crude derivative product was recrystallized from 150 ml. of boiling ethanol, then from a mixture of water and methanol. The purified derivative product weighed 2.5 g., was white and crystalline, and had a melting point of 155–157° C.

The infrared spectrum (KBr pellet) showed $\nu_{C=O}$ 1730 cm.$^{-1}$, $\nu_{O-Ac}$ 1240 cm.$^{-1}$ $\nu_{C-O}$ 1095 cm.$^{-}$. The formula $C_{24}H_{34}O_8$ was consistent with the purified derivative product. The percentage composition by weight of $C_{24}H_{34}O_8$ is C, 64.00; H, 7.61; and O, 28.40. The percentage composition of the purified product was C, 63.94 and H, 7.56.

Example 5

In a 150 ml. beaker equipped with a mechanical stirrer and an oil bath was placed 29.6 g. (0.2 mole) of phthalic anhydride and 12.4 g. (0.033 mole) of terephthalylidene bis pentaerythritol. The mixture was heated at 200° C. with stirring until a clear homogeneous melt had formed. To this melt was added 8.2 g. (0.13 mole) of ethylene glycol and then the melt was heated at 200° C. with stirring for another hour. The acid number of the clear amber melt was determined in acetone to be 147. The hot resin was poured into molds and then cured by heating at 200–250° C. for several hours.

Glass laminates and fiber glass laminates were prepared using an acetone solution of the uncured resin. The laminates were set by allowing them to dry at 25–50° C. before curing.

From the foregoing examples, it can be seen that terephthaldehyde acetals of this invention have been prepared by the above described methods and that the terephthaldehyde acetals of this invention are novel polyhydric alcohols which provide novel, useful alkyd resins when reacted with polybasic acids.

We claim:

1. A terephthaldehyde acetal of the formula:

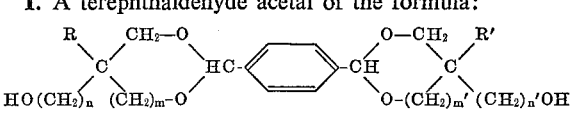

wherein R is selected from the group consisting of hydrogen, methylol, and alkyl containing from 1 to 2 carbon atoms; wherein $m$ is an integer from 0 to 1 inclusive; and wherein $n$ is an integer from 1 to 4 inclusive when $m$ is 0 and wherein $n$ is an integer from 0 to 1 inclusive when $m$ is 1; and wherein R' is selected from the group consisting of hydrogen, methylol, and alkyl containing from 1 to 2 carbon atoms; wherein $m'$ is an integer from 0 to 1 inclusive; and wherein $n'$ is an integer from 1 to 4 inclusive when $m'$ is 0 and wherein $n'$ is an integer from 0 to 1 inclusive when $m'$ is 1.

References Cited

UNITED STATES PATENTS 3,347,871  10/1967  Harding ---------- 260—340.7

OTHER REFERENCES

Korshak et al.: "Chemical Abstracts," vol. 50 (1956), col. 9325f.

Rieche et al.: "Chemical Abstracts," vol. 53 (1959), col. 3192i—94a.

Rondestvedt: "Chemical Abstracts," vol. 55 (1961), col. 25947f–49d.

ALEX MAZEL, Primary Examiner

J. H. TURNIPSEED, Assistant Examiner

U.S. Cl. X.R.

260—88.3, 340.9